(12) United States Patent
Hakola et al.

(10) Patent No.: US 9,386,454 B2
(45) Date of Patent: Jul. 5, 2016

(54) MECHANISM USABLE FOR VALIDATING A COMMUNICATION DEVICE FOR ALLOWING USAGE OF TELEVISION RADIO BANDS/CHANNELS

(75) Inventors: Sami-Jukka Hakola, Kempele (FI); Timo Koskela, Oulu (FI); Samuli Turtinen, Li (FI)

(73) Assignee: BROADCOM CORPORATION, Irvine, CA (US)

( * ) Notice: Subject to any disclaimer, the term of this patent is extended or adjusted under 35 U.S.C. 154(b) by 221 days.

(21) Appl. No.: 13/045,741

(22) Filed: Mar. 11, 2011

(65) Prior Publication Data

US 2012/0233635 A1    Sep. 13, 2012

(51) Int. Cl.
| | |
|---|---|
| *H04W 12/10* | (2009.01) |
| *H04N 21/40* | (2011.01) |
| *H04N 21/414* | (2011.01) |
| *H04N 21/61* | (2011.01) |
| *H04N 21/60* | (2011.01) |
| *H04W 12/02* | (2009.01) |
| *H04W 12/06* | (2009.01) |
| *H04W 8/26* | (2009.01) |
| *H04W 36/00* | (2009.01) |
| *H04W 72/00* | (2009.01) |

(52) U.S. Cl.
CPC ............... *H04W 12/10* (2013.01); *H04N 21/40* (2013.01); *H04N 21/414* (2013.01); *H04N 21/41422* (2013.01); *H04N 21/60* (2013.01); *H04N 21/61* (2013.01); *H04N 21/6131* (2013.01); *H04W 12/02* (2013.01); *H04W 12/06* (2013.01); *H04W 8/26* (2013.01); *H04W 36/00* (2013.01); *H04W 72/00* (2013.01)

(58) Field of Classification Search
USPC .......................................................... 725/62
See application file for complete search history.

(56) References Cited

U.S. PATENT DOCUMENTS

2010/0202410 A1*  8/2010  Watanabe et al. ............. 370/331
2010/0240397 A1*  9/2010  Buchmayer et al. ....... 455/456.1
(Continued)

OTHER PUBLICATIONS

"3GPP TS 24.301 V10.1.0; 3$^{rd}$ Generation Partnership Project; Technical Specification Group Core Network and Terminals; Non-Access-Stratum (NAS) Protocol for Evolved Packet System (EPS); Stage 3 (Release 10)" [online]. Retrieved from the Internet: <http://www.3gpp.org/ftp/Specs/archive/24_series/24.301/24301-a10.zip>, Dec. 2010, 305 pages.

(Continued)

*Primary Examiner* — Justin Shepard
(74) *Attorney, Agent, or Firm* — Oblon, McClelland, Maier & Neustadt, L.L.P

(57) ABSTRACT

There is proposed a mechanism for validating a communication device such as a UE for allowing usage of television radio bands/channels (TVWS). An identification verification process of the communication device is performed by including a unique identification element into an integrity protected and ciphered message related to a radio resource connection reconfiguration procedure, the unique identification element identifying a certified communication device allowed to use radio resources of a television radio band. The message is transmitted to the communication network for performing an identification verification processing with a TVWS database. Furthermore, a mechanism for a handover scenario is provided where validating of the communication device for allowing usage of television radio bands/channels (TVWS) is performed.

18 Claims, 9 Drawing Sheets

(56) References Cited

U.S. PATENT DOCUMENTS

| | | | | |
|---|---|---|---|---|
| 2010/0265915 | A1* | 10/2010 | Sun et al. | 370/331 |
| 2010/0319033 | A1* | 12/2010 | Auranen et al. | 725/62 |
| 2011/0075675 | A1* | 3/2011 | Koodli et al. | 370/401 |
| 2011/0122845 | A1* | 5/2011 | Meirosu et al. | 370/332 |
| 2011/0142004 | A1* | 6/2011 | Bae et al. | 370/331 |
| 2011/0280227 | A1* | 11/2011 | McCann et al. | 370/338 |
| 2012/0122448 | A1* | 5/2012 | Mueck et al. | 455/424 |
| 2012/0159151 | A1* | 6/2012 | Janakiraman et al. | 713/153 |

OTHER PUBLICATIONS

"3GPP TS 33.401 V9.6.0; $3^{rd}$ Generation Partnership Project; Technical Specification Group Services and System Aspects; 3GPP System Architecture Evolution (SAE); Security Architecture (Release 9)" [online]. Retrieved from the Internet: <http://www.3gpp.org/ftp/Specs/archive/33_series/33.401/33401-960.zip>, Dec. 2010, 105 pages.

"3GPP TS 36.331 V10.0.0; $3^{rd}$ Generation Partnership Project; Technical Specification Group Radio Access Network; Evolved Universal Terrestrial Radio Access (E-UTRA); Radio Resource Control (RRC); Protocol Specification (Release 10)" [online]. Retrieved from the Internet: <http://www.3gpp.org/ftp/Specs/archive/36_series/36.331/36331-a00.zip>, Dec. 2010, 276 pages.

"3GPP TS 36.401 V10.1.0; $3^{rd}$ Generation Partnership Project; Technical Specification Group Radio Access Network; Evolved Universal Terrestrial Radio Access Network(EUTRAN); Architecture Description (Release 10)" [online]. Retrieved from the Internet: <http://www.3gpp.org/ftp/Specs/archive/36_series/36.401/36401-a10.zip>, Mar. 2011, 20 pages.

"3GPP TS 36.410 V10.1.1; $3^{rd}$ Generation Partnership Project; Technical Specification Group Radio Access Network; Evolved Universal Terrestrial Radio Access Network(EUTRAN); S1 General Aspects and Principles (Release 10)" [online]. Retrieved from the Internet: <http://www.3gpp.org/ftp/Specs/archive/36_series/36.410/36410-a01.zip>, Mar. 2011, 20 pages.

"IEEE P802.11af™/D1.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications; Amendment 2: TV White Spaces Operation," Institute of Electrical and Electronics Engineers, Inc. (IEEE), New York, Jan. 2011, 159 pages.

"FCC 10-174; Second Memorandum Opinion and Order" [online]. Retrieved from the Internet: <http://www.fcc.gov/Daily_Releases/Daily_Business/2010/db1025/FCC-10-174A1.pdf>. Sep. 23, 2010, 101 pages.

"Current Projects—Wireless Innovation Forum" [online] [Retrieved on Apr. 12, 2011]. Retrieved from the Internet: <http://www.wirelessinnovation.org/mc/page.do?sitePageId=98337&orgId=sdf>. 11 pages.

"IEEE 802.22" [online] [Retrieved on Mar. 17, 2011]. Retrieved from the Internet: <http://en.wikipedia.org/wiki/IEEE_802.22>. 4 pages.

* cited by examiner

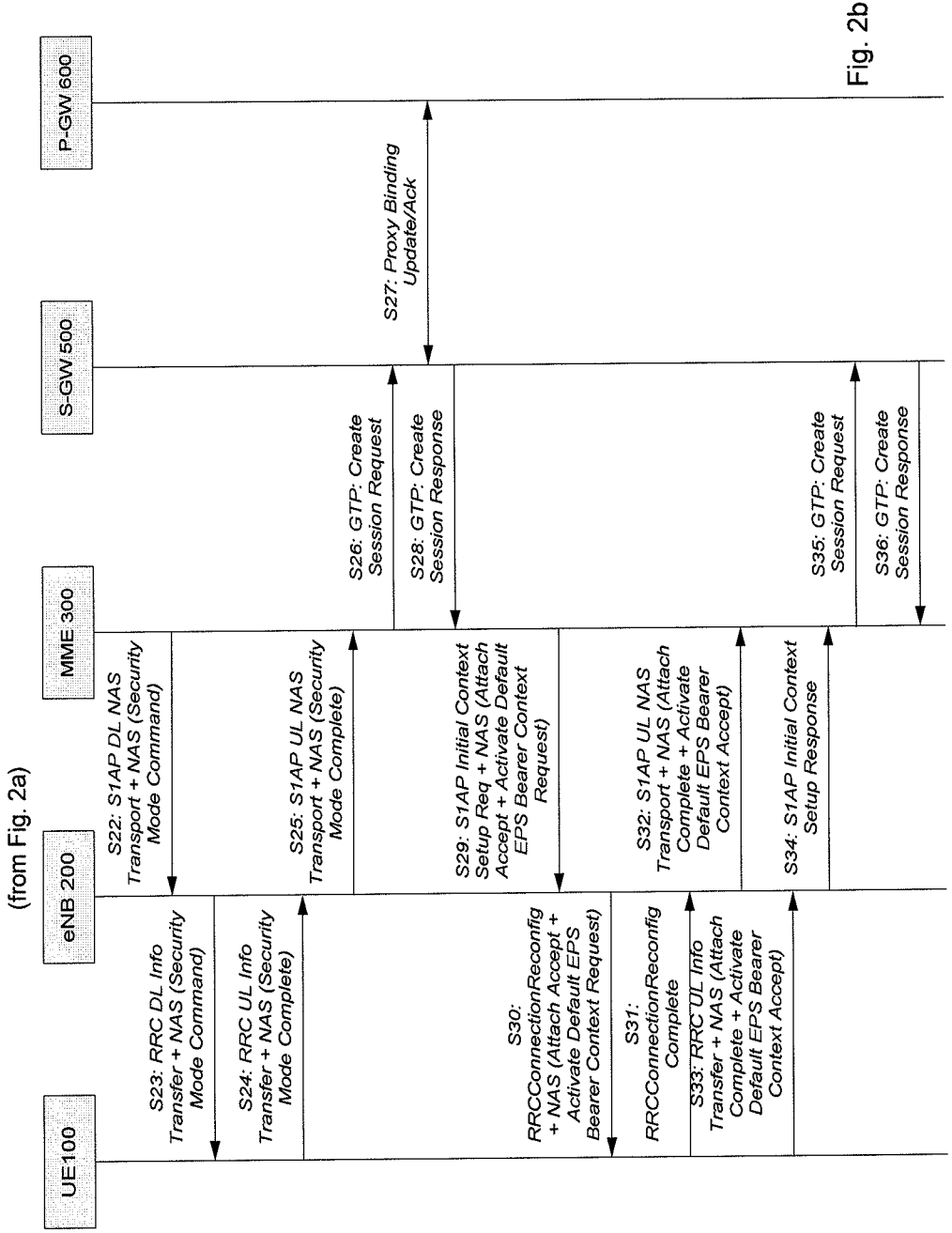

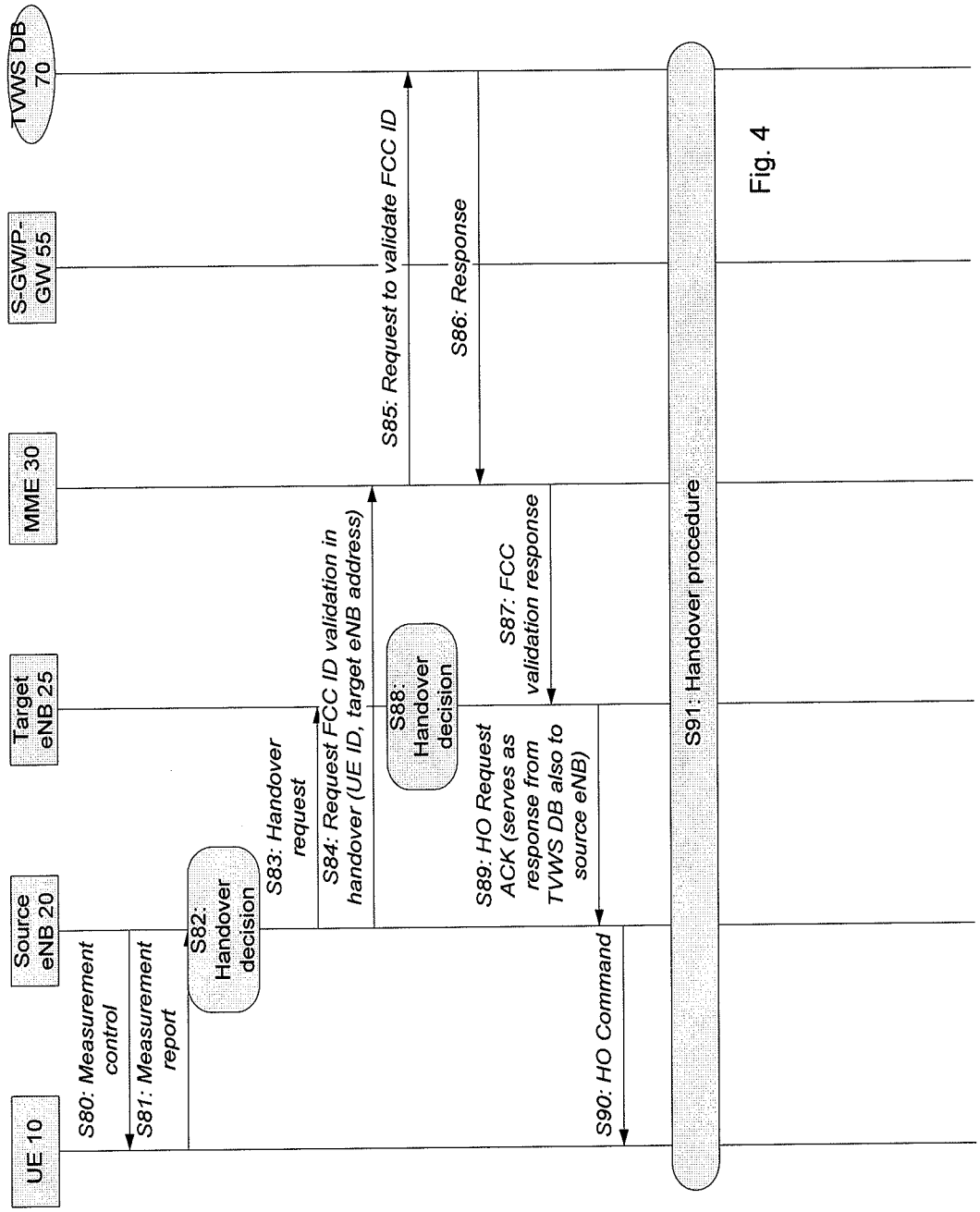

MECHANISM USABLE FOR VALIDATING A COMMUNICATION DEVICE FOR ALLOWING USAGE OF TELEVISION RADIO BANDS/CHANNELS

BACKGROUND OF THE INVENTION

1. Field of the Invention

The present invention relates to a mechanism usable for validating a communication device for allowing usage of television radio bands/channels. In particular, the present invention is related to apparatuses, methods and a computer program product providing a signaling function by means of which a validation process for a communication device capable of using a television radio band/channel for communicating purposes can be executed via a communication network.

2. Related Background Art

Prior art which is related to this technical field can e.g. be found by the technical specification 3GPP TS 36.331 (current version is 10.0.0), 3GPP TS 33.401 (current version is 9.6.0), 3GPP TS 24.301 (current version is 10.1.0), and 3GPP TS 36.40x.

The following meanings for the abbreviations used in this specification apply:
ACK: Acknowledgement
AS: Access Stratum
DL: Downlink
DRB: Data Radio Bearer
E-UTRAN: Evolved Universal Terrestrial Radio Access Network
eNB: evolved Node B
EPC: Enhanced Packet Core
EPS: Evolved Packet System
FCC: Federal Communications Commission
GPRS: General Packet Radio Service
GTP: GPRS Transport Protocol
HO: Handover
HSS: Home Subscriber Server
ID: Identification
LTE: Long Term Evolution
LTE-A: LTE Advanced
MME: Mobility Management Entity
NACK: Non-Acknowledgment
NAS: Non-Access Stratum
P-GW: Packet Data Network Gateway
PDN: Packet Data Network
RRC: Radio Resource Control
S-GW: Serving Gateway
SRB: Signaling Radio Bearer
TV: Television
TVBD: TV Band Device
TVWS: TV White Space
UE: User Equipment
UL: Uplink In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) communication networks like the Universal Mobile Telecommunications System (UMTS), enhanced communication networks based e.g. on LTE, cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN) or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

As licensed band operation has been increasingly utilized in the recent years, operators, service providers, communication device manufacturers, and communication system manufacturers, are all seeking efficient solutions to utilize unlicensed shared band operation.

Communication on an unlicensed shared band is generally based on sharing an available channel between different communication devices. The different communication devices may utilize a common radio access technology, but in certain scenarios, the different communication devices may utilize different radio access technologies and may have different kind of limitations and rules to operate.

As one example for a possible spectrum opportunity, so-called TV white spaces (TVWS) can be mentioned.

Specifically, governmental and/or administrative bodies assign different frequencies for specific applications, and usually license the rights to use these frequencies. This frequency allocation process creates a band plan, which assigns so-called white space, i.e. unused frequencies, between used radio bands or channels to avoid interferences. In some cases, although the frequencies are unused, they have been specifically assigned for a purpose, such as a guard band. In other cases however, these white spaces exist between used channels, since assigning nearby transmissions to immediately adjacent channels will cause destructive interference to both. In addition, there is also unused radio spectrum which has either never been used, or is becoming free as a result of technical changes.

For instance in television there is the example that the switchover to digital television frees up much frequency space.

Thus, the potential use of TV white spaces has been investigated widely in the recent years, due to their available large bandwidths at suitable frequencies for different radio applications. However, the TV spectrum administration is almost country dependent. Currently, the Federal Communications Commission (FCC) of the USA gives detailed description concerning the utilization of TV white spaces' regulations for US area.

At present, the FCC defines two concepts for the help of find available channels: a TV bands database and the geo-location capability to be used in US.

A TV band database that maintains records of all authorized services in the TV frequency bands is capable of determining the available channels as a specific geographic location and provides lists of available channels to TVBSs that have been certified under the FCC's equipment authorization procedures.

The Geo-location capability is defined for some of the TV Band Devices (TVBDs). TVBD with the capability may be able to determine its geographic coordinates within certain level of accuracy (+/−50 m). This capability is used with a TV bands database to determine the availability of TV channels at a TVBD's location.

As an example, based on the concepts of the FCC, several types of TVBDs can be defined wherein corresponding characteristics thereof can be used as the basis for the discrimination therebetween.

Fixed device: A fixed TVBD may be located at a specified fixed location. It may has the following functions;
Able to select channel from the TV bands database.
Able to initiate and operate a network (by sending enabling signals to other fixed TVBDs or personal/portable TVBDs).
Could act as eNB in case of LTE system deployed in TVWS Mode I personal/portable device: Such a device does not use an internal geo-location capability and access to a TV bands database, so it must obtain a channel list from either a fixed TVBD or Mode II personal/portable TVBD (described below). This kind of device may work only as a client/slave, but not as a master
Could act as UE/communication device in case of LTE system deployed in TVWS
Before Mode II/fixed device can give a channel list (i.e. grant frequency resources) it must validate its identification (in the provided FCC based example a so-called FCC ID) in the TVWS database Mode II personal/portable device: A Mode II personal/portable device has similar functions as a fixed TVBD, but does not need to transmit/receive signals at a specified and fixed place
Could act as eNB in case of LTE system deployed in TVWS One possible scenario in an environment as indicated above (i.e. according to FCC definitions) may be to use an LTE based communication system in TVWS wherein for example either fixed devices or Mode II devices/TVBDs act as eNBs, while Mode I devices are used as attached communication devices/UEs. However, as indicated above, it is required that an access network control element, such as the fixed and Mode II device acting as an eNB, validates each attached communication devices/UEs (i.e. a Mode I device) at the TV WS database before it can be granted any radio resource. For such a validation process, it is necessary to deliver a unique identification element identifying the communication device/UE as a certified device being allowed to use radio resources on the television radio bands/channels (in case of the FCC example, this unique identification element is called FCC ID of the Mode I device) to the TVWS database using a secured connection

SUMMARY OF THE INVENTION

It is an object of the invention to provide an apparatus, method and computer program product by means of which a validation process of a communication device can be made in an efficient manner. Furthermore, it is an object of the present invention to provide an apparatus, method and computer program product by means of which a validation process of a communication device in an intra-system mobility scenario (handover) can be made in an efficient manner. Specifically, it is an object of the present invention to provide an apparatus, method and computer program product prevent excessive service interruption time due to requirement to validate a communication device when it changes a serving access network control element (e.g. an eNB) in TVWS.

These objects are achieved by the measures defined in the attached claims.

According to an example of the proposed solution, there is provided, for example, an apparatus comprising an identification verification processor configured to perform an identification verification process of a communication device for allowing a usage of radio resources of a television radio band, wherein the identification verification processor is further configured to include a unique identification element into a message related to a radio resource connection reconfiguration procedure, the unique identification element identifying a certified communication device allowed to use radio resources of a television radio band, and a transmitter processor configured to transmit the message related to a radio resource connection reconfiguration procedure including the unique identification element to an access network control element of a communication system, wherein the identification verification processor is further configured to select, from messages related to a radio resource connection reconfiguration procedure, an integrity protected and ciphered message for including the unique identification element.

In addition, according to an example of the proposed solution, there is provided, for example, an apparatus comprising a verification process relay processor configured to perform a relay function in an identification verification process of a communication device for allowing a usage of radio resources of a television radio band, wherein the verification process relay processor is further configured to receive from a requesting device a message related to a radio resource connection reconfiguration procedure including a unique identification element identifying a certified communication device allowed to use radio resources of a television radio band, and a forwarding processor configured to transmit the unique identification element to a core network control element of a communication system for performing the identification verification process, wherein the message related to a radio resource connection reconfiguration procedure is an integrity protected and ciphered message.

Furthermore, according to an example of the proposed solution, there is provided, for example, an apparatus comprising a device verification processor configured to perform an identification verification process of a communication device for allowing a usage of radio resources of a television radio band, wherein the device verification processor is further configured to receive from an access network control element a message including a unique identification element identifying a certified communication device allowed to use radio resources of a television radio band, and an interrogation processor configured to interrogate a database comprising data indicating certified communication devices allowed to use radio resources of a television radio band whether the received unique identification element is validated by the data of the database or not, wherein the device verification processor is further configured to forward a result of the interrogation of the database to an access network control element.

Moreover, according to an example of the proposed solution, there is provided, for example, an apparatus comprising a handover decision processor configured to decide that a communication connection of a communication device is to be changed from a source access network control element to a target access network control element, and a verification requesting processor configured to send a verification request message to a core network control element for requesting to perform an identification verification process of the communication device for allowing a usage of radio resources of a television radio band.

In addition, according to an example of the proposed solution, there is provided, for example, an apparatus comprising a device verification processor configured to perform an identification verification process of a communication device for allowing a usage of radio resources of a television radio band, wherein the device verification processor is further configured to receive from an access network control element a verification request message for requesting to perform an identification verification process of a communication device for which a handover procedure is to be conducted, and an interrogation processor configured to interrogate a database comprising data indicating certified communication devices allowed to use radio resources of a television radio band, wherein the interrogation is based on a unique identification element of the communication device which is to be validated by the data of the database, wherein the device verification processor is further configured to forward a result of the interrogation of the database to a target access network control element of the handover procedure.

Furthermore, according to an example of the proposed solution, there is provided, for example, an apparatus comprising a handover processor configured to decide whether a communication connection of a communication device can be changed from a source access network control element to a target access network control element, and a verification receiving processor configured to receive a result of an identification verification process of the communication device for allowing a usage of radio resources of a television radio band from core network control element, wherein the handover processor is further configured to send a message related to the handover to the source access network control element, the message indicating the result of the identification verification process.

In addition, according to an example of the proposed solution, there is provided, for example, a method comprising performing an identification verification process of a communication device for allowing a usage of radio resources of a television radio band, including a unique identification element into a message related to a radio resource connection reconfiguration procedure, the unique identification element identifying a certified communication device allowed to use radio resources of a television radio band, and transmitting the message related to a radio resource connection reconfiguration procedure including the unique identification element to an access network control element of a communication system, wherein an integrity protected and ciphered message is selected for including the unique identification element, from messages related to a radio resource connection reconfiguration procedure.

Furthermore, according to an example of the proposed solution, there is provided, for example, a method comprising performing a relay function in an identification verification process of a communication device for allowing a usage of radio resources of a television radio band, receiving from a requesting device a message related to a radio resource connection reconfiguration procedure including a unique identification element identifying a certified communication device allowed to use radio resources of a television radio band, and transmitting the unique identification element to a core network control element of a communication system for performing the identification verification process, wherein the message related to a radio resource connection reconfiguration procedure is an integrity protected and ciphered message.

In addition, according to an example of the proposed solution, there is provided, for example, a method comprising performing an identification verification process of a communication device for allowing a usage of radio resources of a television radio band, receiving from an access network control element a message including a unique identification element identifying a certified communication device allowed to use radio resources of a television radio band, interrogating a database comprising data indicating certified communication devices allowed to use radio resources of a television radio band whether the received unique identification element is validated by the data of the database or not, and forwarding a result of the interrogation of the database to an access network control element.

Moreover, according to an example of the proposed solution, there is provided, for example, a method comprising deciding that a communication connection of a communication device is to be changed from a source access network control element to a target access network control element, and sending a verification request message to a core network control network for requesting to perform an identification verification process of the communication device for allowing a usage of radio resources of a television radio band.

Furthermore, according to an example of the proposed solution, there is provided, for example, a method comprising performing an identification verification process of a communication device for allowing a usage of radio resources of a television radio band, receiving from an access network control element a verification request message for requesting to perform an identification verification process of a communication device for which a handover procedure is to be conducted, interrogating a database comprising data indicating certified communication devices allowed to use radio resources of a television radio band, wherein the interrogation is based on a unique identification element of the communication device which is to be validated by the data of the database, and forwarding a result of the interrogation of the database to a target access network control element of the handover procedure.

In addition, according to an example of the proposed solution, there is provided, for example, a method comprising deciding whether a communication connection of a communication device can be changed from a source access network control element to a target access network control element, receiving a result of an identification verification process of the communication device for allowing a usage of radio resources of a television radio band from core network control element, and sending a message related to the handover to the source access network control element, the message indicating the result of the identification verification process.

Furthermore, according to examples of the proposed solution, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

By virtue of the proposed solutions, it is possible to provide a signaling mechanism in a communication network in order to execute in an efficient way a validation procedure for a communication device so as to be allowed to use resources of a television radio band/channel. For example, by means of the proposed solution, a signaling mechanism is provided which can complement communication systems such as LTE/LTE-A systems to fulfill the requirements set by governmental and/or administrative bodies such as the FCC for the TVWS usage. Furthermore, it is possible to provide efficient means to enable a communication system such as an LTE system to operate in the TVWS wherein also in an intra-system mobility scenario excessive service interruption time due to validation of the communication device is prevented when it changes a serving eNB in TVWS.

The above and still further objects, features and advantages of the invention will become more apparent upon referring to the description and the accompanying drawings.

BRIEF DESCRIPTION OF THE DRAWINGS

FIG. 4 shows a signaling diagram illustrating a mobility signaling procedure for a communication device in a communication network with a television radio band/channel usage according to a further example of an embodiment of the invention.

DESCRIPTION OF PREFERRED EMBODIMENTS

In the following, examples and embodiments of the present invention are described with reference to the drawings. For illustrating the present invention, the examples and embodiments will be described in connection with a communication system which may be based on a 3GPP LTE system. However, it is to be noted that the present invention is not limited to an application in such a communication system or environment but is also applicable in other communication systems, connection types and the like.

A basic system architecture of a communication network may comprise a commonly known architecture comprising a wired or wireless access network subsystem and a core network. Such an architecture comprises one or more access network control units, radio access network elements, access service network gateways or base transceiver stations, such as eNBs, with which a communication device or UE is capable to communicate via one or more channels for transmitting several types of data. Furthermore, core network elements such as gateway network elements, policy and charging control network elements, mobility management entities and the like are usually comprised. The general functions and interconnections of those elements, depending on the actual network type, are known to those skilled in the art and described in corresponding specifications so that a detailed description thereof is omitted herein. However, it is to be noted that several additional network elements and signaling links may be employed for a communication connection to or from UEs, besides those described in detail herein below.

Furthermore, the described network elements, such as network nodes like UEs, eNBs (access network control elements or base stations), MMES (core network control elements) or the like, as well as corresponding functions as described herein may be implemented by software, e.g. by a computer program product for a computer, and/or by hardware. In any case, for executing their respective functions, correspondingly used devices and network elements may comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like.

Figure 1:
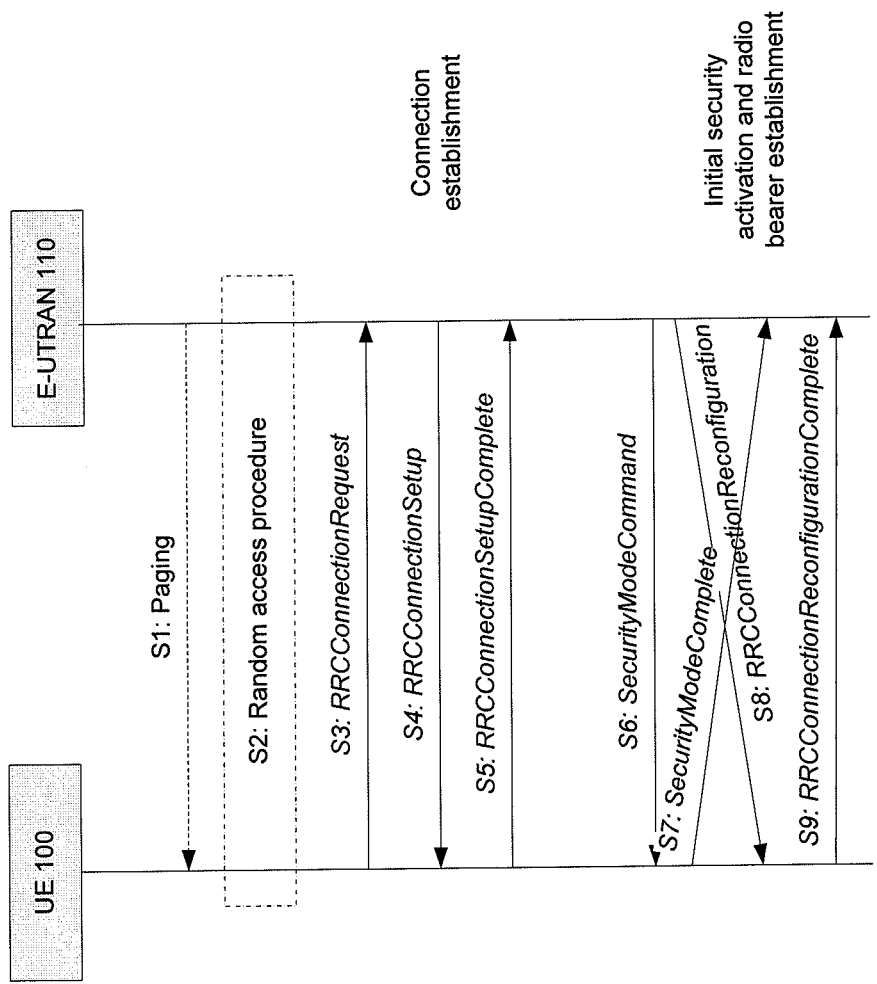
FIG. 1 shows a signaling diagram illustrating a connection establishment procedure according to a reference example.
Figure 2A:
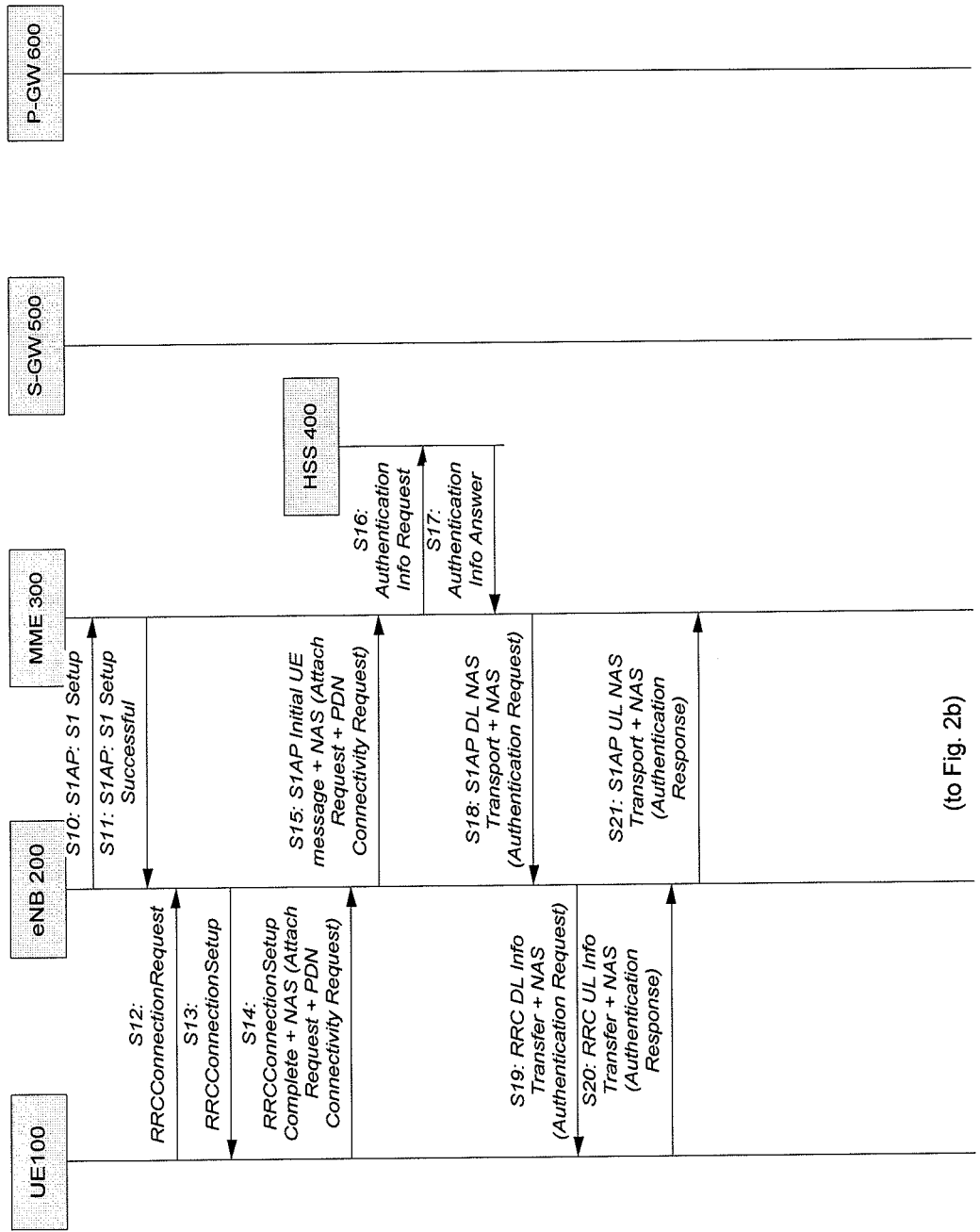
FIG. 2a/b show a signaling diagram illustrating an initial attach procedure of a communication device in a communication network according to a further reference signal.

In FIGS. 1 and 2, signaling diagrams are shown which illustrates reference examples for explaining how an initial attach procedure for a communication device in a communication network based on LTE is executed.

It is to be noted that the network architectures indicated in FIGS. 1 and 2 mentions only those network elements or parts which are useful for understanding the principles underlying examples of embodiments of the invention to be later described. As known by those skilled in the art there may be several other network elements involved in the initial attach procedure for establishing a communication connection which are omitted here for the sake of simplicity.

Specifically, FIG. 1 shows a signaling diagram describing a general approach for an initial attachment procedure of a communication device such as an UE 100 with an access network side, such as an E-UTRAN 110, in a 3GPP LTE based communication network configuration.

Referring to FIG. 1, in step S1, the UE 100 received a paging signal sent from a base station such as an eNB (not shown in FIG. 1). Then, in step S2, a random access procedure is executed between the UE 100 and the E-UTRAN 110, which may be based on a standard procedure known to those skilled in the art and thus not further discussed herein. In step S3, the UE sends a message to the E-UTRAN 110 requesting a radio resource connection (RRCConnectionRequest message). The message in S3 is answered by the E-UTRAN 110 by an RRCConnectionSetup message in step S4 in which information concerning radio resources usable for the UE 100 are transmitted. In step S5, the UE 100 confirms the RRC connection setup with a RRCConnectionSetupComplete message to the E-UTRAN 110.

It is to be noted that steps S3 to S5 can be summarized as (initial) connection establishment for the UE 100.

Next, after completion of the (initial) connection establishment, the E-UTRAN 110 starts in connection with steps S6 to S9 an initial security activation and radio bearer establishment procedure. Specifically, in step S6, the E-UTRAN 110 sends a message to the UE 100 comprising a SecurityMode-Commmand. The UE 100 answers the message in step S7 with a SecurityModeComplete message.

In parallel to the SecurityModeCommmand signaling, the E-UTRAN can also send a RRCConnectionReconfiguration message in step S8, which may be sent to the UE 100 before receiving a response to the signaling in step S6. The UE 100 answers the RRCConnectionReconfiguration message of step S8 with a RRCConnectionReconfigurationComplete message in step S9.

Specifically, in a connection establishment procedure as depicted in FIG. 1 (and as further detailed in FIG. 2 described below), in the initial connection establishment procedure (here an RRC Connection Establishment) as done in steps S3 to S5, an RRC connection is established. The RRC connection establishment involves also an SRB1 establishment. The procedure is also used to transfer the initial NAS dedicated information/message from the UE 100 to E-UTRAN 110.

The E-UTRAN 110 completes the RRC connection establishment prior to completing the establishment of a connection towards a core network control element, such as an MME 300 (shown in FIG. 2), i.e. prior to receiving UE context information from the EPC. Consequently, AS security is not activated during the initial phase of the RRC connection (i.e. before step S6).

Upon receiving the UE context from the EPC, the E-UTRAN 110 activates security (both ciphering and integrity protection) using the initial security activation procedure, starting at step S6. The RRC messages to activate security (command and successful response) are integrity protected, while ciphering is started only after completion of the procedure. That is, the response to the message used to activate security is not ciphered, while the subsequent messages (e.g. used to establish SRB2 and DRBs) are both integrity protected and ciphered.

In the initial security activation, the E-UTRAN 110 initiates the security mode command procedure to the UE 100 in RRC_CONNECTED at step S6. Moreover, the E-UTRAN 110 applies the procedure when only SRB1 is established, i.e. prior to establishment of SRB2 and/or DRBs.

In the following, details of operations carried out by the UE 100 upon reception of the SecurityModeCommand message in step S6 from the E-UTRAN 110 are indicated.

Specifically, according to this example, the UE 100 is able to derive keys for secure communication, such as a $K_{eNB}$ key, as specified in TS 33.401, a $K_{RRCint}$ key associated with an algorithm for integrity protection, such as integrityProtAlgorithm indicated in the SecurityModeCommand message, as specified in TS 33.401. Furthermore, the UE 100 may be able to request lower layers to verify the integrity protection of the SecurityModeCommand message, using the algorithm indicated by the integrityProtAlgorithm as included in the SecurityModeCommand message and the $K_{RRCint}$ key. If the SecurityModeCommand message passes the integrity protection check, the UE 100 may derive a $K_{RRCenc}$ key and a $K_{UPenc}$ key associated with a ciphering algorithm, such as the cipheringAlgorithm indicated in the SecurityModeCommand message, as specified in TS 33.401. Furthermore, the UE 100 may be able to configure lower layers to apply integrity protection using the indicated algorithm and the $K_{RRCint}$ key immediately, i.e. integrity protection shall be applied to all subsequent messages received and sent by the UE 100, including the SecurityModeComplete message. Then, the UE 100 may configure lower layers to apply ciphering using indicated algorithm, the $K_{RRCenc}$ key and the $K_{UPenc}$ key after completing the procedure, i.e. ciphering shall be applied to all subsequent messages received and sent by the UE 100, except for the SecurityModeComplete message which is sent unciphered. The UE can now consider the AS security to be activated, and submit the SecurityModeComplete message to lower layers for transmission, upon which the procedure ends.

Thus, the NAS security mode command procedure consists of a roundtrip of messages between the core network control element, such as the MME, and the UE, wherein a base station such as an eNB functions as a relaying node between these entities. Specifically, as will be further shown in FIG. 2, the MME sends the NAS security mode command to the UE and the UE replies with the NAS security mode complete message. Before reception of the reply from the UE, the E-UTRAN can send RRCConnectionReconfiguration message (see also step S8) including radio resource configuration used to establish SRB2 and one or more DRBs.

FIG. 2 shows a signaling diagram describing, based on the general approach according to FIG. 1, an initial attachment procedure of a communication device such as the UE 100 in a communication network, such as a 3GPP LTE based communication network configuration. Besides the UE 100, the communication network where the signaling according to FIG. 2 is executed comprises a eNB 200 as an access network control element, an MME 300 as a core network control element, a HSS 400 for authentication procedure, a S-GW 500 and a P-GW 600. The basic functions of these network elements are known to those skilled in the art and thus not explained in detail here.

According to the signaling procedure shown in FIG. 2, in steps S10 and S11, the eNB 200 and the MME 300 perform an initial setup for establishing a link or interface therebetween (S1 interface or reference point) by sending a S1AP message with a S1 setup request from the eNB 200 to the MME 300 and a S1AP message with a S1 setup successful message from the MME 300 to the eNB 200, after which a link between the access network and the core network is established.

In step S12, the UE 100 requests a connection establishment by sending an RRCConnectionRequest message to the eNB 200, which is answered by the eNB 200 with a RRCConnectionSetup message in step S13. In step S14, the UE 100 sends a RRCConnectionSetupComplete message to the eNB 200. Steps S12 to S14 correspond to steps S3 to S5 in FIG. 1.

As indicated above, with the RRCConnectionSetupComplete message in step S14, the UE 100 sends also initial NAS dedicated information/message, i.e. an attach request and a PDN connectivity request. The eNB 200 forwards this information to the MME 300 in step S15 with a S1AP initial UE message comprising the NAS information from the UE 100. Upon receiving this message, the MME 300 performs an authentication procedure with the HSS 400 in steps S16 (authentication information request) and S17 (authentication information answer).

When the authentication procedure with the HSS 400 is completed, the MME 300 sends in step S18 a S1AP DL NAS Transport message to the eNB 200 including NAS information regarding an authentication request for the UE 100. The eNB 200 sends a RRC DL Information Transfer message in step S19 to the UE 100 which includes the authentication request.

In response thereto, in step S20, the UE 100 sends a RRC UL Information Transfer message to the eNB 200 which includes NAS information regarding the authentication response. The eNB 200 forwards this information to the MME 300 in step S21 with a S1AP UL NAS Transport message comprising the NAS information (authentication response) from the UE 100.

Upon receiving the authentication response from the UE 100, the MME 300 initiates a security mode activation processing. Specifically, in step S22, the MME 300 sends to the eNB 200 an S1AP DL NAS Transport message comprising the NAS information (security mode command) for the UE 100. The eNB 200 forwards this NAS information to the UE 100 by means of a RRC DL Information Transfer message in step S23 to the UE 100 which includes the NAS information (security mode command). This corresponds to step S6 in FIG. 1.

In step S24 (which corresponds to step S7 in FIG. 1) the UE 100 answers to the security mode command with a RRC UL Information Transfer message to the eNB 200 which includes NAS information regarding security mode complete. The eNB 200 forwards this information to the MME 300 in step S25 with a S1AP UL NAS Transport message comprising the NAS information (security mode complete) from the UE 100.

In step S26, the MME performs a session creation procedure for the UE 100 by sending a create session request to the S-GW 500 via a GTP message. The S-GW 500 performs a proxy binding update/acknowledgement procedure in step S27 with the P-GW 600, and replies to the create session request of step S26 from the MME 300 with a create session response message in step S28, via a GTP link.

The MME 300 sends in step S29 a S1AP Initial Context Setup Request message including NAS information, i.e. Attach Accept information and Activate Default EPS Bearer Context Request information, to the eNB 200, which represent a reply to the message in step S14/S15. The eNB 200 forwards in step S30 the NAS information (Attach Accept information and Activate Default EPS Bearer Context information) to the UE 100 with a RRCConnectionReconfiguration message including the NAS information (corresponding to step S8 in FIG. 1).

The UE 100 replies to the message in step S30 by a RRC-ConnectionReconfigurationComplete message sent to the eNB 200 in step S31 (corresponding to step S9 in FIG. 1). The eNB 200 informs the MME 300 thereabout in step S32 by sending a S1AP Initial Context Setup Response message.

After sending the RRCConnectionReconfiguration-Complete message in step S31, the UE 100 sends in step S33 a further RRC UL Information Transfer message including NAS information, i.e. an Attach complete information and an Activate Default EPS Bearer Context Accept information to the eNB 200, which in turn forwards this information (Attach complete information and Activate Default EPS Bearer Context Accept information) to the MME 300 with a S1AP UL NAS Transport message in step S34. The MME 300 performs then a create session procedure with the S-GW 500 by means of GTP messages in steps S35 (create session request) and S36 (create session response).

Figure 3A:
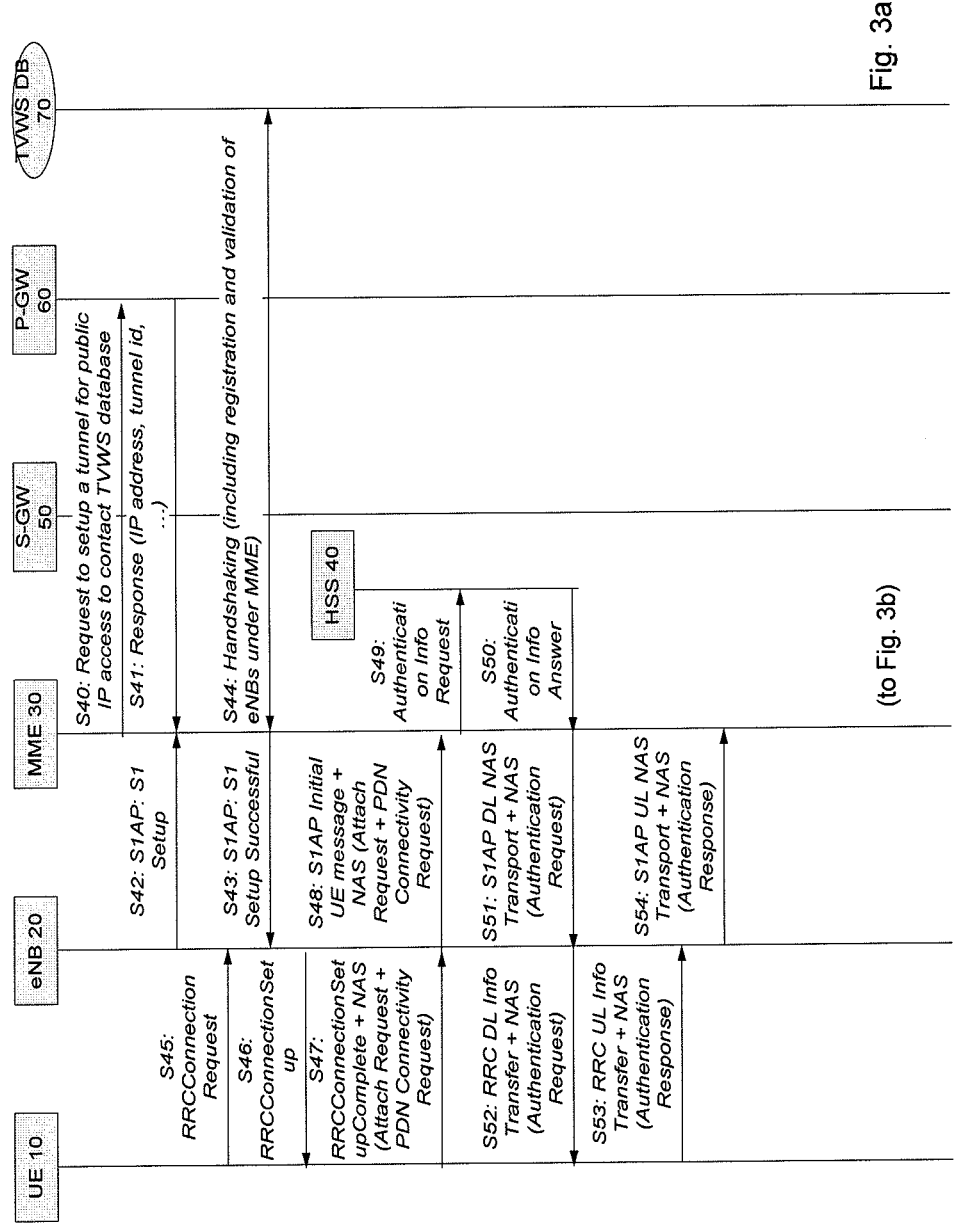
FIG. 3a/b show a signaling diagram illustrating an initial attach procedure of a communication device in a communication network with a television radio band/channel usage according to an example of an embodiment of the invention.
Figure 3B:
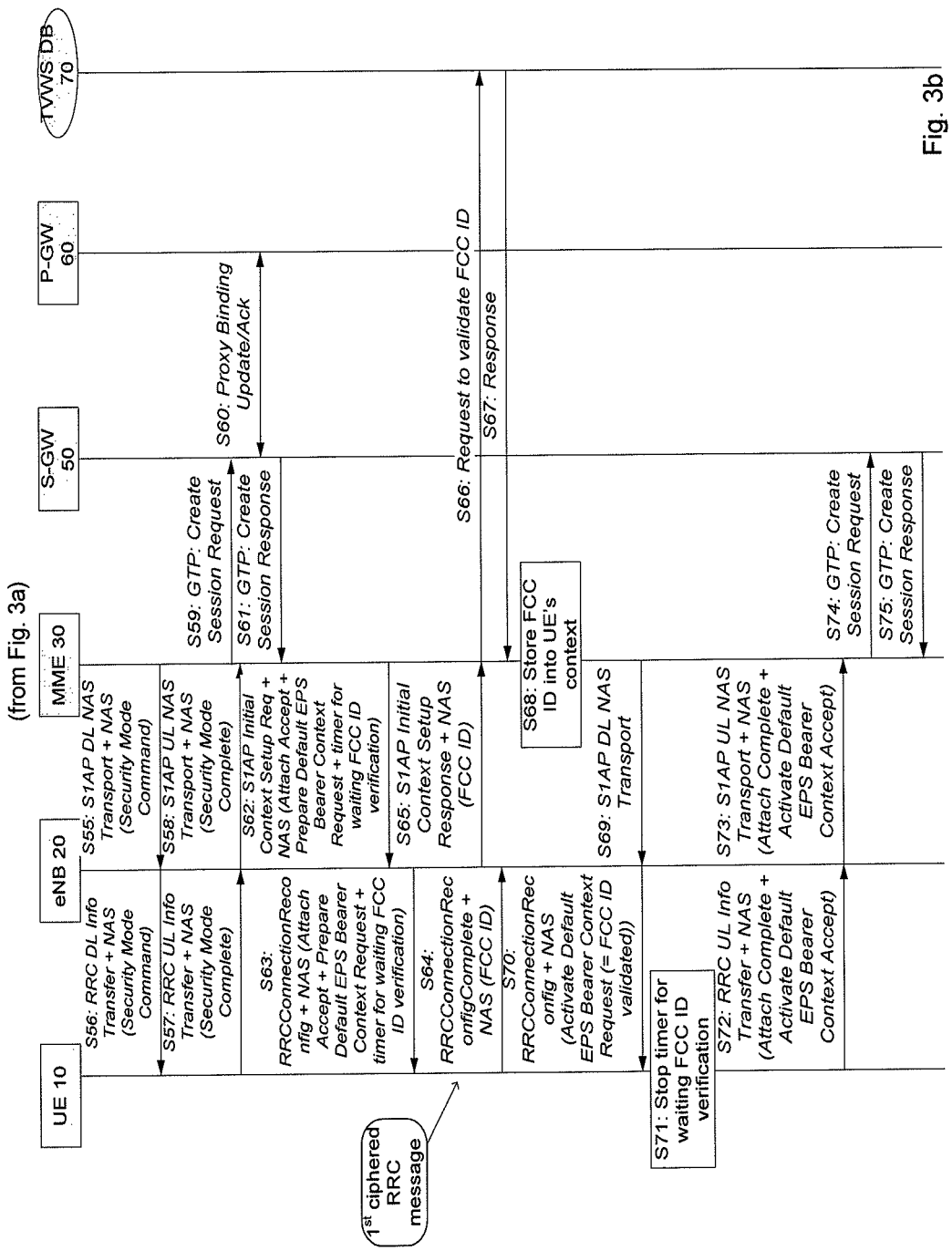

Next, with regard to FIG. 3, an example of an embodiment of the invention is described. Specifically, the example of an embodiment of the invention depicted in FIG. 3 is related to an initial attach procedure of a communication device or UE to a communication network, such as a 3GPP LTE based network, wherein access to television radio band/channel resources, such as TVWS resources, is allowed by verifying that the requesting communication device is a certified device.

Generally, according to examples of embodiments to which the example according to FIG. 3 belongs, it is proposed to transport a unique identification element which is used to validate that the requesting communication device is a certified communication device allowed to use radio resources of a television radio band/channel as a piggybacked information element in a message during the initial security activation procedure, wherein the selected message is transmitted using integrity protection as well as ciphering. For example, in an LTE based communication system like that described in the above reference example according to FIG. 2, the UE may send a piggybacked NAS message carrying the unique identification element (which is referred to hereinafter also as "FCC ID") in the RRCConnectionReconfigurationComplete message associated with the initial security activation procedure. This RRCConnectionReconfigurationComplete message is preferably the first message transmitted using integrity protection as well as ciphering. Thus, the FCC ID can be conveyed in a secure way to the MME for proxy-like storage.

It is to be noted that according to the present example of an embodiment of the invention, the UE/communication device is generally not allowed to transmit data before the unique identification element is validated as belonging to a certified device allowed to use television radio band/channel resources (WS resources, for example) by an authorized entity, such as a TVWS database validating the given FCC ID. Thus, according to examples of embodiments of the invention, the following restrictions can be established.

First, when the system is configured to operate only by using television radio band/channel resources, i.e. only in TVWS, the first RRCConnectionReconfiguration (done parallel or just after SecurityModeCommand) is not able to setup/activate any DRB as long as the validation of the FCC ID has not been granted.

Otherwise, as a second point, when the system is configured to use a licensed spectrum as anchor spectrum (e.g. normal radio resources allocated to an LTE system or the like), any DRB on the television radio band/channel resources (TVWS) is not setup/activated before an explicit activation/setup message is issued by the E-UTRAN.

For example, the setup/activation of DRB(s) in the television radio band/channel resources (TVWS) may be done after the serving eNB receives an indication from the MME that the access is granted for the device belonging to the unique identification element (such as a 'FCC WS grant' indication).

A detailed example of an embodiment of the invention regarding a UE initial attach procedure comprising a validation for using TVWS resources is described in the signaling diagram according to FIG. 3.

FIG. 3 shows a signaling diagram describing, based on the reference example according to FIG. 2, an initial attachment procedure of a communication device such as a UE 10 in a communication network, such as a 3GPP LTE based communication network configuration. Besides the UE 10, the communication network where the signaling according to FIG. 3 is executed comprises an eNB 20 as an access network control element, a MME 30 as a core network control element, a HS 40 for authentication procedure, a S-GW 50, a P-GW 60, and a TVWS database (TVBS DB) 70 for validating a UE as being a certified UE allowed to use TVWS resources. The basic functions of these network elements are known to those skilled in the art and thus not explained in detail here.

According to the signaling procedure shown in FIG. 3, in steps S40 and S41, the MME 30 requests at the P-GW 60 to setup a tunnel for a public IP access to contact the TVWS database 70, which is responded by the G-GW 60 with an IP address and a tunnel identification to the TVWS DB 70. In step S44, the MME 30 and the TVWS DB 70 perform a handshaking procedure including a registration and validation of access network control elements (eNBs) under the control of the MME 30.

Otherwise, in steps S42, S43, and S46 to S61, messages and processings corresponding to those described in connection with steps S10 to S28 according to FIG. 2 between UE 100 (corresponding to UE 10), eNB 200 (corresponding to eNB 20), MME 300 (corresponding to MME 30), HSS 400 (corresponding to HSS 40), S-GW 500 (corresponding to S-GW 50) and P-GW 600 (corresponding to P-GW 60) are executed in the signaling procedure according to FIG. 3. Thus, for the sake of simplicity, reference is made to the corresponding descriptions of steps S10 to S28 with regard to steps S42, S43, and S46 to S61 according to FIG. 3.

In step S62 according to FIG. 3, after the MME 30 has performed the session creation procedure for the UE 10 with the S-GW 50 and the P-GW 60, the MME 30 sends in step S62 a S1AP Initial Context Setup Request message including NAS information to the eNB 20 which represent a reply to the message in step S47/S48 (corresponding to steps S14/S15 of FIG. 2). According to the present example of an embodiment of the invention, the NAS information in step S62 comprises, besides an Attach Accept information, a Prepare Default EPS Bearer Context Request information and a timer information for setting a timer in the UE 10 indicating a waiting time until which a verification result for the validation of the UE 10 by the TVWS DB 70 is to be received. However, it is to be noted that the timer information may also be excluded, and a corresponding timer value may be preset, for example, in the UE 10 or in the eNB 20 by default setting. The eNB 20 forwards in step S63 the NAS information (Attach Accept information, Prepare Default EPS Bearer Context Request information, timer information) to the UE 10 with a RRCConnectionReconfiguration message including the NAS information.

The UE 10 replies to the message in step S63 by a RRCConnectionReconfigurationComplete message sent to the eNB 20 in step S64. This RRCConnectionReconfigurationComplete message represents the first message transmitted by using integrity protection as well as ciphering, so that according to the example of an embodiment of the invention the UE 10 includes the unique identification element (FCC ID) which is used to validate that the UE 10 as a certified communication device allowed to use radio resources of a television radio band/channel (TVWS) as a piggybacked information element (NAS information) in this message in step S64. Furthermore, the UE 10 may start a timer for waiting for the verification of its unique identification element (FCC ID).

The eNB 20 forwards the NAS information including the unique identification element (FCC ID) to the MME 30 in step S65 by sending a S1AP Initial Context Setup Response message including the FCC ID.

When the MME 30 receives the unique identification element (FCC ID) of the requesting UE 10, it performs an identification validation process with the TVWS DB 70 by using the connection established in step S44. In detail, in step S66, the MME 30 sends a request to validate the received unique identification element (FCC ID) to the TVWS DB 70. The TVWS DB 70 verifies the unique identification element (FCC ID), e.g. by comparing it with identification element (FCC IDs) of certified communication devices stored therein, and returns a response to the MME 30 in step S67 for indicating the validation result.

Assuming that the validation result is positive, i.e. the TWVS DB 70 verifies that the requesting UE 10 is a certified device allowed to use TVWS resources, the MME 30 stores in step S68 the unique identification element (FCC ID) of the requesting UE 10 and maps it to UE contexts relating the UE 10.

In step S69, the MME 30 sends a S1AP DL NAS Transport message to the eNB in which, as a NAS information, the result of the identification verification processing with the TVWS DB 70 (received in step S67) is forwarded (both a positive or a negative result indication).

In step S70, the eNB 20 sends a RRCConnectionReconfiguration message to the UE 10. This message comprises NAS information comprising an Activate Default EPS Bearer Context Request in case the result of the identification verification processing with the TVWS DB 70 is positive. In other words, in case the UE 10 receives information regarding an Activate Default EPS Bearer Context Request in step S70, this is equivalent to an indication that the validation of the UE 10 as a certified device was successful. Thus, the timer started in step S64 is stopped in step S71.

If no such indication of a successful validation is received by the UE 10 within the time set for the timer, the procedure may be restart beginning from step S63, for example, with a reset timer.

Otherwise, in case a negative result for the identification verification processing is indicated to the eNB 20, the eNB 20 may send a NACK message or the like to the UE 10 with regard to the validation thereof as certified device, including for example a corresponding failure code or the like indicating the UE 10 the reason for the negative decision of the TVWS DB 70.

The further steps S72 to S75 are again in correspondence with steps S33 to S36 according to FIG. 2. That is, the UE 10 sends in step S72 a further RRC UL Information Transfer message including NAS information, i.e. an Attach complete information and an Activate Default EPS Bearer Context Accept information to the eNB 20, which in turn forwards this information (Attach complete information and Activate Default EPS Bearer Context Accept information) to the MME 30 with a S1AP UL NAS Transport message in step S73. The MME 30 performs then a create session procedure with the S-GW 50 by means of GTP messages in steps S74 (create session request) and S75 (create session response).

Next, a further example of embodiments of the invention is described with reference to FIG. 4. Specifically, this example of embodiment of the invention relates to a validation processing of a communication device/UE for television radio band/channel resources access in an intra-system mobility scenario (handover scenario).

Basically, according to the present example of embodiments of the invention, when it is decided that a handover processing is to be conducted for communication connection of a communication device, such as a UE, from a first (source) access network control element to a second (target) access network control element, a validation that the UE to be handed over is a certified communication device which is allowed to use television radio band/channel (TVWS) resources is executed as described below. Specifically, when the source eNB decides for a UE being, e.g. in RRC_CONNECTED state to make a handover, the core network control element, such as the MME, is requested to send a validation request message for the UE under mobility procedure (i.e. the UE to be handed over) by using its unique identification element (FCC ID) at a TVWS database or the like. When receiving the response from the TVWS database (validation result), the MME sends the response further to the aimed target eNB. If the response from the TVWS database is positive and the target eNB has also decided to acknowledge the handover to its cell, it sends a HO Request ACK to the source eNB. Otherwise, if the response from the database was negative, the target eNB sends a HO Request NACK to the source eNB with appropriate cause information included. In case the communication network is an LTE based network, and the validation is successful, the handover procedure may performed as specified.

A further example of an embodiment of the invention comprises that the eNBs stores the unique identification elements of the UEs connected thereto (e.g. received in the initial RRCConnectionReconfigurationComplete message (step S64 of FIG. 3) by the UE/communication device. Thus, when a handover decision for one of these UEs is made, the source eNB may send the unique identification element (FCC ID) of the UE in question together with an FCC ID validation request message towards the TVWS database. If the eNB is not aware of the IP address of the TVWS database, the eNB may send a request to another network element having a connection the TVWS database, e.g. the MME, in order to carry out the FCC ID validation request message transmission to the TVWS database by using the unique identification element (FCC ID) stored in the eNB.

With regard to the signaling diagram shown in FIG. 4, a corresponding procedure is illustrated. Specifically, FIG. 4 shows a signaling diagram describing an mobility signaling method in TVWS for an LTE based communication network configuration. A communication device such as a UE 10 is connected with a communication network comprising a source eNB 20 as an access network control element (the eNB to which the UE 10 is actually connected), a target eNB 25 (an eNB which it the target of a handover procedure from the eNB 20) as an access network control element, a MME 30 as a core network control element, a S-GW/P-GW 55, and a TVWS database (TUBS DB) 70 for validating a UE as being a certified UE allowed to use TVWS resources. The basic functions of these network elements are known to those skilled in the art and thus not explained in detail here.

In step S80, the serving eNB 20 (source eNB 20) sends a measurement control message to the UE 10 in order to retrieve connection measurement reports usable for a handover decision. The measurement report is sent to the source eNB 20 in step S81. In step S82, the source eNB 20 makes a handover decision for the UE 10 on the basis of the received measurement report.

Therefore, in step S83, the source eNB 20 sends a handover request message to the selected target eNB 25. In parallel, it sends a verification request message to the core network control element, i.e. the MME 30 in which it triggers the MME 30 to send a validation request to the TVWS database to verify that the UE 10 is a certified device allowed to use TVWS resources, for example. The verification request message sent in step S84 comprises at least address information of the target eNB 25 since the MME 30 has to send information to this element. Furthermore, the verification request message comprises identification information of the UE 10, and may comprise the unique identification element (FCC ID) if this is stored in the eNB 20.

When the MME 30 receives the verification request message with the information indicated above, it starts an identification verification process with the TVWS 70 (via a connection established with the aid of the S-GW/P-GW 55, for example). That is, the MME 30 sends the unique identification element (FCC ID) of the UE 10 (which is either received in the message of step 84 from the source eNB 20, or is determined in an own memory or the like by using the UE ID) to the TVWS DB 70 in step S85. The TVWS DB 70 verifies the unique identification element (FCC ID), e.g. by comparing it with identification element (FCC IDs) of certified communication devices stored therein, and returns a response to the MME 30 in step S86 for indicating the validation result.

When receiving the response from the TVWS database 70, the MME 30 sends in step S87 a message to the target eNB 25 in which the result is indicated. If the response from the TVWS database 70 is positive and the target eNB 25 has decided in step S88 to acknowledge the handover to its cell, the eNB 25 sends a HO Request ACK message to the source eNB. This HO Request ACK message may serve also as an indication of a positive response for the verification request message in step S84.

Otherwise, if the response from the TVWS database 70 was negative, or the handover decision in step S88 is negative, the target eNB 25 sends a HO Request NACK to the source eNB 20 with an appropriate cause information included.

In step S90, provided the HO Request ACK message is received in step S89, the source eNB 20 sends a handover command message to the UE 10 so as to initiate the handover procedure in step S91 which may be performed in accordance with standardized procedures and is thus not described in further details herein.

As indicated above, according to examples of embodiments of the invention, for example in connection with step S68 according to FIG. 3, the core network control element (e.g. the MME) is configured to store and keep unique identification elements (FCC IDs) of UEs having a connection to the communication network controlled by the MME, and to map the unique identification elements (FCC IDs) to corresponding UE contexts. For example, this new functionality supporting LTE TV WS operation, can be called a WS management function or the like (in case of an MME, the new functionality may be called MME-WS (Mobility Management Entity-White Space))

For example, such a function (referred to hereinafter as MME-WS) may be an additional functionality which is located inside the respective core network control element (e.g. the MME entity), or alternatively is provided as a separate entity wherein the core network control element (MME) has an interface or the like to it.

The MME-WS function may have a connection to the TVWS database via the internet. Additionally or alternatively, in case a local TVWS database (inside the EPC or the like which could be under operator control to aid TVBDs to select operator preferred channels) is maintained, the MME-WS has an interface to it. It is to be noted that the use of a local TVWS database does not omit the requirement to validate the unique identification element (FCC ID).

Furthermore, according to examples of embodiments of the invention, the MME-WS may have configurable parameters to control the amount of associated information and e.g. the duration of a UE context-FCC ID association.

Figure 5:
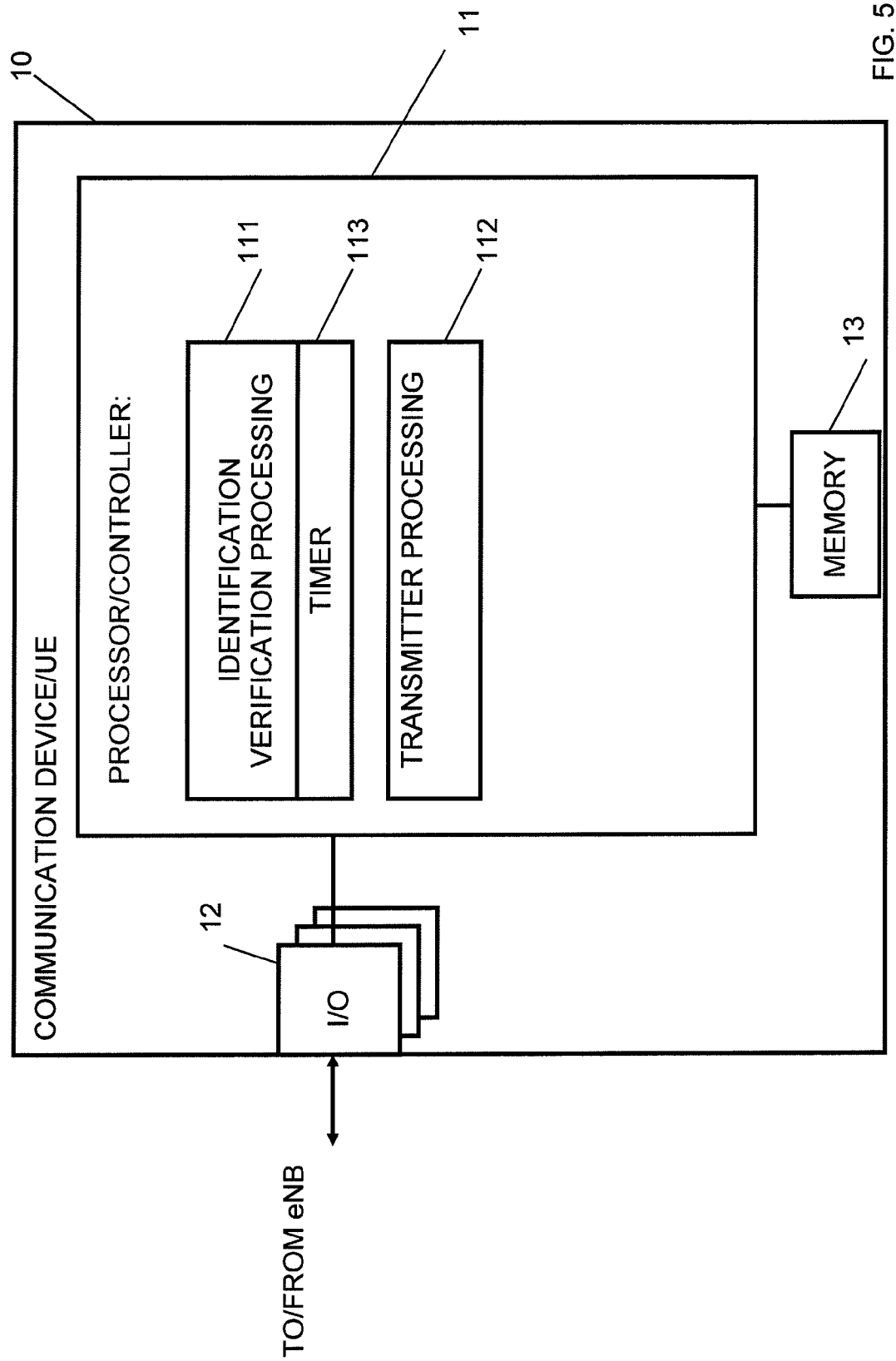
FIG. 5 shows a block circuit diagram illustrating a configuration of a communication device according to examples of embodiments of the invention.

In FIG. 5, a block circuit diagram is shown illustrating a configuration of a communication device, such as the UE 10, which is configured to implement the processing as described in connection with FIG. 3, for example. It is to be noted that the communication device or UE 10 shown in FIG. 5 may comprise several further elements or functions besides those described herein below, which are omitted herein for the sake of simplicity as they are not essential for understanding the invention.

The UE 10 may comprise a processing function or processor 11, such as a CPU or the like, which executes instructions given by programs or the like related to the power control. The processor 11 may comprise further portions dedicated to specific processings as described below. Portions for executing such specific processings may be also provided as discrete elements or within one or more further processors, for example. Reference signs 12 denote transceiver or input/output (I/O) units connected to the processor 11. The I/O units 12 may be used for communicating with other network elements, such as the eNB 20. The I/O units 12 may be a combined unit comprising communication equipment towards several of the network elements in question, or may comprise a distributed structure with a plurality of different interfaces for each network elements in question. Reference sign 13 denotes a memory usable, for example, for storing data and programs to be executed by the processor 11 and/or as a working storage of the processor 11.

The processor 11 is configured to execute processings related to the initial attach procedure described above. In particular, the processor 11 comprises a sub-portion 111 which is usable as an identification verification processor. The identification verification processor 111 may be configured to perform processings comprising including a unique identification element into a message related to a radio resource connection reconfiguration procedure; selecting, from messages related to a radio resource connection reconfiguration procedure, an integrity protected and ciphered message for including the unique identification element (for example the first such message); receiving a message related to a radio resource connection reconfiguration procedure and determining from the received message whether or not the identification verification is successful on the basis of a validation result of the unique identification element, wherein in case the identification verification is successful, the identification verification processor is further configured to initiate an activation procedure of a data radio bearer using radio resources of the television radio band; receiving an initial message related to a radio resource connection reconfiguration procedure, the initial message including an instruction to prepare a radio bearer context request and an information for setting a timer to a predetermined waiting time for receiving a verification result in an identification verification process of a communication device for allowing a usage of radio resources of a television radio band, and starting the identification verification process after receiving the initial message. Furthermore, there is also provided a timer portion 113 set in accordance with the information for setting a timer to the predetermined waiting time. Furthermore, the processor 11 comprises a sub-portion 112 which is usable as a transmitter processor configured to transmit the message related to a radio resource connection reconfiguration procedure including the unique identification element to an access network control element of a communication system. Thus, the processor 11 (including the portions 111, 112 and 113) is configured to execute processings according to steps S63, S64, S70 and S71 according to FIG. 3.

Figure 6:
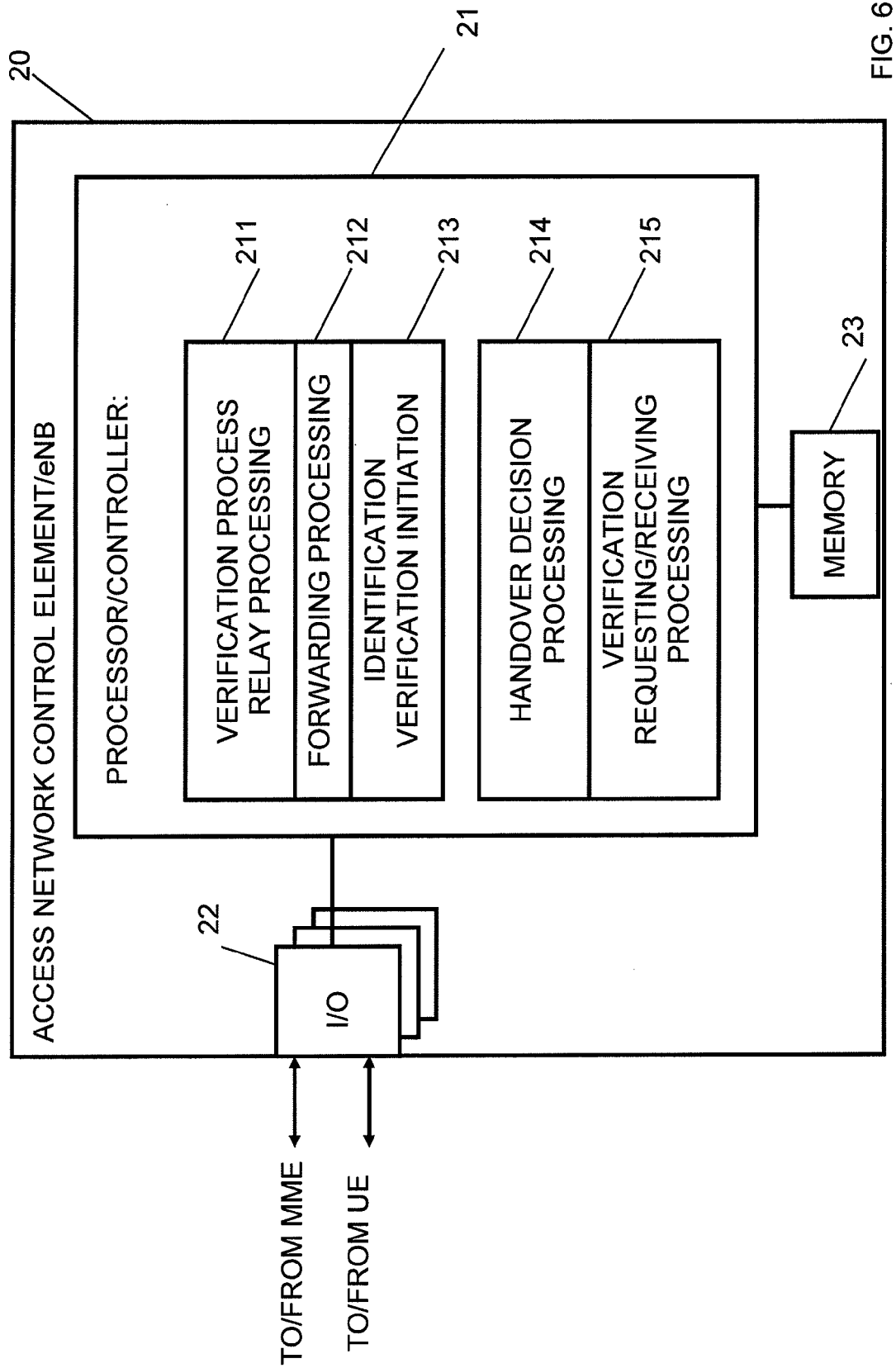
FIG. 6 shows a block circuit diagram illustrating a configuration of an access network control element according to examples of embodiments of the invention.

In FIG. 6, a block circuit diagram is shown illustrating a configuration of an access network control element, such as the eNB 20, which is configured to implement the processings as described in connection with FIG. 3 and FIG. 4, for example. It is to be noted that the access network control element or eNB 20 shown in FIG. 6 may comprise several further elements or functions besides those described herein below, which are omitted herein for the sake of simplicity as they are not essential for understanding the invention.

The eNB 20 may comprise a processing function or processor 21, such as a CPU or the like, which executes instructions given by programs or the like related to the power control. The processor 21 may comprise further portions dedicated to specific processings as described below. Portions for executing such specific processings may be also provided as discrete elements or within one or more further processors, for example. Reference signs 22 denote transceiver or input/output (I/O) units connected to the processor 21. The I/O units 22 may be used for communicating with other network elements, such as communication devices or UEs and core network control elements (MME 30). The I/O units 22 may be a combined unit comprising communication equipment towards several of the network elements in question, or may comprise a distributed structure with a plurality of different interfaces for each network elements in question. Reference sign 23 denotes a memory usable, for example, for storing data and programs to be executed by the processor 21 and/or as a working storage of the processor 21.

The processor 21 is configured to execute processings related to the initial attach procedure described above with regard to FIG. 3 and the mobility (handover) procedure described above with regard to FIG. 4. In particular, the processor 21 comprises a sub-portion 211 which is usable as verification process relay processor configured to perform processings of a relay function in an identification verification process of a communication device for allowing a usage of radio resources of a television radio band; receiving from a requesting device a message related to a radio resource connection reconfiguration procedure including a unique identification element identifying a certified communication device allowed to use radio resources of a television radio band; receiving a validation result of the unique identification element indicating whether or not the identification verification is successful; generating a further message related to a radio resource connection reconfiguration procedure comprising an information about whether or not the identification verification is successful on the basis of the received validation result; initiating sending of the further message to the requesting device; initiating a setup or activation of at least one data radio bearer when the received validation result indicates that the identification verification is successful.

Furthermore, the processor 21 comprises a sub-portion 212 which is usable as a transmitter processor configured to transmit the message related to a radio resource connection reconfiguration procedure including the unique identification element to an access network control element of a communication system. Moreover, the processor 21 comprises a sub-portion 213 which is usable as an identification verification initiating processor configured to send an initial message related to a radio resource connection reconfiguration procedure to a communication device, the initial message including an instruction to prepare a radio bearer context request and an information for setting a timer to a predetermined waiting time for receiving a verification result in an identification verification process of a communication device for allowing a usage of radio resources of a television radio band.

On the other hand, the processor 21 comprises a sub-portion 214 which is usable as a handover decision processor configured to decide that a communication connection of a communication device is to be changed from a source access network control element to a target access network control element. Furthermore, the processor 21 comprises a sub-portion 215 which is usable as a verification requesting processor (when the access network control element functions as a source eNB in the handover procedure, for example) or as a verification receiving processor (when the access network control element functions as a target eNB in the handover procedure, for example) configured to send receive a verification request message to a core network control element for requesting to perform an identification verification process of the communication device for allowing a usage of radio resources of a television radio band, or to receive a result of the identification verification process.

Thus, the processor 21 (including the portions 211, 212 and 213) is configured to execute processings according to steps S62, S63, S64, S65, S69 and S70 according to FIG. 3, wherein the processor 21 (including the portions 214 and 215) is configured to execute processings according to steps S82 to S84 and S87 to S89 according to FIG. 4.

Figure 7:
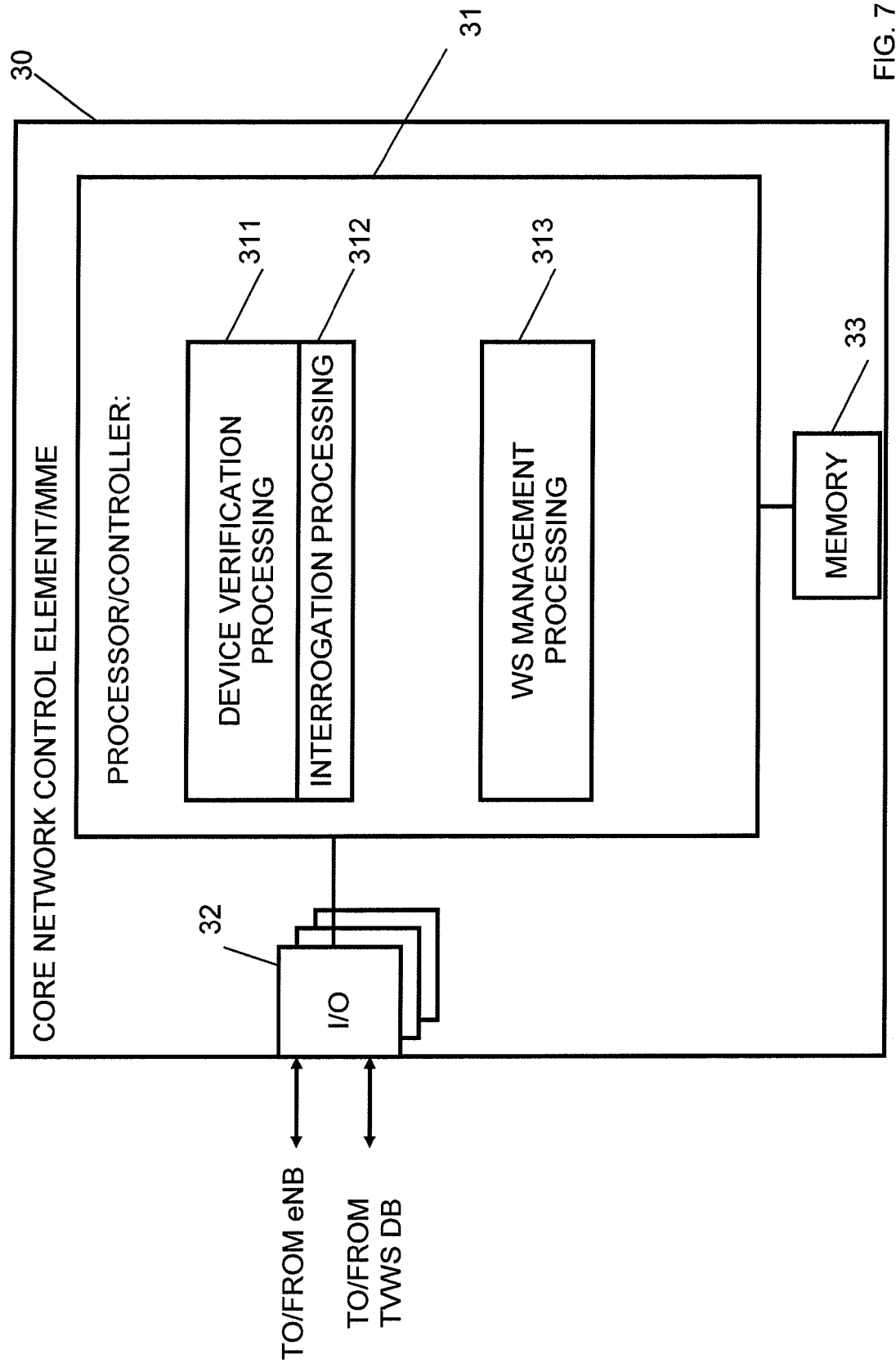
FIG. 7 shows a block circuit diagram illustrating a configuration of a core network control element according to examples of embodiments of the invention.

In FIG. 7, a block circuit diagram is shown illustrating a configuration of a core network control element, such as the MME 30, which is configured to implement the processings as described in connection with FIG. 3 and FIG. 4, for example. It is to be noted that the core network control element or MME 30 shown in FIG. 7 may comprise several further elements or functions besides those described herein below, which are omitted herein for the sake of simplicity as they are not essential for understanding the invention.

The MME 30 may comprise a processing function or processor 31, such as a CPU or the like, which executes instructions given by programs or the like related to the power control. The processor 31 may comprise further portions dedicated to specific processings as described below. Portions for executing such specific processings may be also provided as discrete elements or within one or more further processors, for example. Reference signs 32 denote transceiver or input/output (I/O) units connected to the processor 31. The I/O units 32 may be used for communicating with other network elements, such as the access network control elements or a TVWS database or the like. The I/O units 32 may be a combined unit comprising communication equipment towards several of the network elements in question, or may comprise a distributed structure with a plurality of different interfaces for each network elements in question. Reference sign 33 denotes a memory usable, for example, for storing data and programs to be executed by the processor 31 and/or as a working storage of the processor 31.

The processor 31 is configured to execute processings related to the initial attach procedure described above with regard to FIG. 3 and the mobility (handover) procedure described above with regard to FIG. 4. In particular, the processor 31 comprises a sub-portion 311 which is usable as a device verification processor configured to perform an identification verification process of a communication device for allowing a usage of radio resources of a television radio band, wherein the device verification processor is further configured to receive from an access network control element a message including a unique identification element identifying a certified communication device allowed to use radio resources of a television radio band. Furthermore, the device verification processor portion 311 is further configured to forward a result of the interrogation of the database to an access network control element, that is in an initialization procedure according to FIG. 3 to the requesting eNB 20, and in the handover procedure according to FIG. 4 to the target eNB 25, for example.

Furthermore, the processor 31 comprises a sub-portion 312 which is usable as an interrogation processor configured to interrogate a database comprising data indicating certified communication devices allowed to use radio resources of a television radio band (TVWS DB 70) whether the received unique identification element is validated by the data of the database or not.

On the other hand, the processor 31 comprises a sub-portion 313 which is usable as a white space management processing portion configured to store the received unique identification element, and to map the unique identification network element to contexts related to the certified communication device.

Thus, the processor 31 (including the portions 311 and 312) is configured to execute processings according to steps S62, S65, S66, S67, S68 (in particular with regard to portion 313) and S69 according to FIG. 3, and processings according to steps S84 to S87 according to FIG. 4.

As described above, examples of embodiments of the invention are in particular applicable in communication devices such as UEs, and in access network control elements and core network control elements like E-UTRAN devices and MME devices. Furthermore, examples of embodiments of the invention are also applicable in modems, such as LTE modems, utilizing TVWS.

According to an examples of embodiments of the present invention, there are also provided the following devices.

For example, there is provided a device comprising an identification verification means for performing an identification verification process of a communication device for allowing a usage of radio resources of a television radio band, wherein the identification verification means includes a unique identification element into a message related to a radio resource connection reconfiguration procedure, the unique identification element identifying a certified communication device allowed to use radio resources of a television radio band, and a transmitter means for transmitting the message related to a radio resource connection reconfiguration procedure including the unique identification element to an access network control element of a communication system, wherein the identification verification means further selects, from messages related to a radio resource connection reconfiguration procedure, an integrity protected and ciphered message for including the unique identification element.

In addition, according to a further example, there is provided a device comprising a verification process relay means for performing a relay function in an identification verification process of a communication device for allowing a usage of radio resources of a television radio band, wherein the verification process relay means further receives from a requesting device a message related to a radio resource connection reconfiguration procedure including a unique identification element identifying a certified communication device allowed to use radio resources of a television radio band, and a forwarding means for transmitting the unique identification element to a core network control element of a communication system for performing the identification verification process, wherein the message related to a radio resource connection reconfiguration procedure is an integrity protected and ciphered message.

Furthermore, according to a further example, there is provided a device comprising a device verification means for performing an identification verification process of a communication device for allowing a usage of radio resources of a television radio band, wherein the device verification means further receives from an access network control element a message including a unique identification element identifying a certified communication device allowed to use radio resources of a television radio band, and an interrogation means for interrogating a database comprising data indicating certified communication devices allowed to use radio resources of a television radio band whether the received unique identification element is validated by the data of the database or not, wherein the device verification means further forwards a result of the interrogation of the database to an access network control element.

Moreover, according to a further example, there is provided a device comprising a handover decision means for deciding that a communication connection of a communication device is to be changed from a source access network control element to a target access network control element, and a verification requesting means sending a verification request message to a core network control element for requesting to perform an identification verification process of the communication device for allowing a usage of radio resources of a television radio band.

In addition, according to a further example, there is provided a device comprising a device verification means for performing an identification verification process of a communication device for allowing a usage of radio resources of a television radio band, wherein the device verification means further receives from an access network control element a verification request message for requesting to perform an identification verification process of a communication device for which a handover procedure is to be conducted, and an interrogation means for interrogating a database comprising data indicating certified communication devices allowed to use radio resources of a television radio band, wherein the interrogation is based on a unique identification element of the communication device which is to be validated by the data of the database, wherein the device verification means further forwards a result of the interrogation of the database to a target access network control element of the handover procedure.

Furthermore, according to a further example, there is provided a device comprising a handover means for deciding whether a communication connection of a communication device can be changed from a source access network control element to a target access network control element, and a verification receiving means for receiving a result of an identification verification process of the communication device for allowing a usage of radio resources of a television radio band from core network control element, wherein the handover means further sends a message related to the handover to the source access network control element, the message indicating the result of the identification verification process.

For the purpose of the present invention as described herein above, it should be noted that

- an access technology via which signaling is transferred to and from a network element or node may be any technology by means of which a node can access an access network (e.g. via a base station or generally an access node). Any present or future technology, such as WLAN (Wireless Local Access Network), WiMAX (Worldwide Interoperability for Microwave Access), LTE, LTE-A, BlueTooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto,
- usable access networks and transmission nodes may be any device, apparatus, unit or means by which a station, entity or other user equipment may connect to and/or utilize services offered by the access network; such services include, among others, data and/or (audio-) visual communication, data download etc.;
- a user equipment or communication device may be any device, apparatus, unit or means by which a system user or subscriber may experience services from an access network, such as a mobile phone, personal digital assistant PDA, or computer;
- method steps likely to be implemented as software code portions and being run using a processor at a network element or terminal (as examples of devices, apparatuses and/or modules thereof, or as examples of entities including apparatuses and/or modules for it), are software code independent and can be specified using any known or future developed programming language as long as the functionality defined by the method steps is preserved;
- generally, any method step is suitable to be implemented as software or by hardware without changing the idea of the invention in terms of the functionality implemented;
- method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;
- devices, apparatuses, units or means can be implemented as individual devices, apparatuses, units or means, but this does not exclude that they are implemented in a distributed fashion throughout the system, as long as the functionality of the device, apparatus, unit or means is preserved,
- an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
- a device may be regarded as an apparatus or as an assembly of more than one apparatus, whether functionally in cooperation with each other or functionally independently of each other but in a same device housing, for example.

As described above, there is proposed a mechanism for validating a communication device such as a UE for allowing usage of television radio bands/channels (TVWS). An identification verification process of the communication device is performed by including a unique identification element into an integrity protected and ciphered message related to a radio resource connection reconfiguration procedure, the unique identification element identifying a certified communication device allowed to use radio resources of a television radio band. The message is transmitted to the communication network for performing an identification verification processing with a TVWS database. Furthermore, a mechanism for a handover scenario is provided where validating of the communication device for allowing usage of television radio bands/channels (TVWS) is performed.

Although the present invention has been described herein before with reference to particular embodiments thereof, the present invention is not limited thereto and various modifications can be made thereto.

The invention claimed is:

1. A TV Band Device (TVBD) configured to perform as a target eNodeB in a Long Term Evolution (LTE) system, the TVBD comprising:
   circuitry configured to
      receive, in the TVBD configured to perform as the target eNodeB, a handover request from a source eNodeB requesting a handover of a user equipment (UE) to the TVBD configured to perform as the target eNodeB;
      receive a message from a TV white space (TVWS) database indicating whether the UE is a certified device allowed to use TVWS resources;
      if the message from the TVWS database indicates that the UE is a certified device, transmit a positive handover acknowledgment to the source eNodeB; and
      after performing a handover procedure, communicate with the UE using the LTE system.

2. The TVBD according to claim 1, wherein the circuitry is further configured to
- generate a handover decision based on the received handover request; and
- transmit the positive handover acknowledgment to the source eNodeB when the handover decision is positive and when the message from the TVWS database indicates that the UE is a certified device.

3. The TVBD according to claim 2, wherein the positive handover acknowledgment transmitted to the source eNodeB indicates that the message received from the TVWS database indicated that the UE is a certified device.

4. The TVBD according to claim 2, wherein the message received from the TVWS is a response to a verification request sent from the source eNodeB to the TVWS database, the verification request including a unique identification number of the UE and an address of the TVBD.

5. The TVBD according to claim 1, wherein the message from the TVWS database is received from a Mobility Management Entity (MME), which relays the message from the TVWS database to the TVBD.

6. The TVBD according to claim 4, wherein the unique identification number of the UE included in the verification request transmitted by the source eNodeB is stored in the source eNodeB.

7. A communication system comprising:
user equipment (UE) apparatus;
a TV Band Device (TVBD) configured to perform as a target eNodeB in a Long Term Evolution (LTE) system; and
a source eNodeB, wherein
the source eNodeB includes circuitry configured to
- generate a handover decision to hand over a user equipment (UE) connected to the source eNodeB to the TVBD configured to perform as the target eNodeB;
- transmit a handover request to the TVBD configured to perform as the target eNodeB requesting a handover of the user equipment (UE);
- immediately after transmitting the handover request, transmit a verification request to a TV white space (TVWS) database, requesting verification as to whether the UE is a certified device allowed to use TVWS resources;
- receive a handover acknowledgment from the TVBD configured to perform as the target eNodeB indicating whether the UE is a certified device allowed to use TVWS resources;
- if the received handover acknowledgment is positive, perform a handover procedure with the TVBD configured to perform as the target eNodeB, and the TVBD configured to perform as the target eNodeB includes circuitry configured to
- receive the handover request from the source eNodeB requesting the handover of the user equipment (UE);
- receive a message from a TV white space (TVWS) database indicating whether the UE is a certified device allowed to use TVWS resources;
- if the message from the TVWS database indicates that the UE is a certified device, transmit a positive handover acknowledgment to the source eNodeB; and
- after performing a handover procedure, communicate with the UE using the LTE system.

8. The communication system according to claim 7, wherein the circuitry of the TVBD is further configured to
- generate a handover decision based on the received handover request; and
- transmit the positive handover acknowledgment to the source eNodeB when the handover decision is positive and when the message from the TVWS database indicates that the UE is a certified device.

9. The communication system according to claim 8, wherein the positive handover acknowledgment transmitted to the source eNodeB indicates that the message received from the TVWS database indicated that the UE is a certified device.

10. The communication system according to claim 8, wherein the message received from the TVWS is a response to a verification request sent from the source eNodeB to the TVWS database, the verification request including a unique identification number of the UE and an address of the TVBD.

11. The communication system according to claim 7, wherein the message from the TVWS database is received from a Mobility Management Entity (MME), which relays the message from the TVWS database to the TVBD.

12. The communication system according to claim 10, wherein the unique identification number of the UE included in the verification request transmitted by the source eNodeB is stored in the source eNodeB.

13. An eNodeB device configured as a source eNodeB in a Long Term Evolution (LTE) system, the eNodeB device comprising:
circuitry configured to
- generate a handover decision to hand over a user equipment (UE) connected to the source eNodeB to a target eNodeB that is a TV Band Device (TVBD);
- transmit a handover request to the target eNodeB that is the TVBD requesting a handover of the user equipment (UE);
- immediately after transmitting the handover request, transmit a verification request to a TV white space (TVWS) database, requesting verification as to whether the UE is a certified device allowed to use TVWS resources;
- receive a handover acknowledgment from the target eNodeB that is the TVBD indicating whether the UE is a certified device allowed to use TVWS resources;
- if the received handover acknowledgment is positive, perform a handover procedure with the target eNodeB that is the TVBD.

14. The eNodeB device according to claim 13, wherein the circuitry of the eNodeB device is further configured to
receive the positive handover acknowledgment from the TVBD when a handover decision in the TVBD is positive and when a message received in the TVBD from the TVWS database in response to the verification request indicates that the UE is a certified device.

15. The eNodeB device according to claim 14, wherein the received positive handover acknowledgment indicates that the message received from the TVWS database indicated that the UE is a certified.

16. The eNodeB device according to claim 14, wherein the message received in the TVBD from the TVWS is a response to the transmitted verification request, the verification request including a unique identification number of the UE and an address of the TVBD.

17. The eNodeB according to claim 14, wherein the message received in the TVBD from the TVWS database is received from a Mobility Management Entity (MME), which relays the message from the TVWS database to the TVBD.

18. The eNodeB according to claim 16, wherein the unique identification number of the UE included in the verification request transmitted by the eNodeB is stored in the eNodeB.

* * * * *